United States Patent [19]

Prehn

[11] 4,173,025
[45] Oct. 30, 1979

[54] ELECTRICAL SIGNAL SCRAMBLING APPARATUS

[76] Inventor: Lawrence D. Prehn, OCSigO, 3C 340, The Pentagon, Washington, D.C. 20310

[21] Appl. No.: 642,058

[22] Filed: Jan. 18, 1946

[51] Int. Cl.² .................................................. H04N 1/44
[52] U.S. Cl. ...................................... 358/259; 178/22; 179/1.5 S
[58] Field of Search ................ 178/22; 179/1.5, 1.5 S; 358/259

[56] References Cited

U.S. PATENT DOCUMENTS

| | | | |
|---|---|---|---|
| 1,522,775 | 1/1925 | Friedman | 178/22 |
| 1,657,366 | 1/1928 | Belin | 178/22 |
| 2,312,897 | 3/1943 | Guanilla et al. | 179/1.5 C |
| 2,313,209 | 3/1943 | Valensi | 179/1.5 E |
| 2,401,888 | 6/1946 | Smith | 179/1.5 C |
| 2,406,353 | 8/1946 | Myers | 179/1.5 C |
| 2,424,998 | 8/1947 | Nyquist | 179/1.5 R |

*Primary Examiner*—S. C. Buczinski
*Attorney, Agent, or Firm*—John R. Utermohle

EXEMPLARY CLAIM

2. In an apparatus of the nature described, the combination of means for storing a portion of an electrical signal, means for picking up elements of said portion, a plurality of switching means controlling the conduction of said elements each switching means having a conducting condition and a nonconducting condition, and means for controlling the conductivity of the switching means including a bank of groups of switch contacts each group comprising contacts as numerous as the switching means, and means for selectively closing by groups the contacts of said bank.

11 Claims, 7 Drawing Figures

4,173,025

ELECTRICAL SIGNAL SCRAMBLING APPARATUS

This invention is in secret communication systems, and particularly in secret facsimile transmission systems. Specifically, it comprises a method and apparatus for so treating a facsimile signal as to make it unintelligible except to a person having a proper apparatus properly adjusted. Otherwise, the received signal will not produce a legible facsimile of the original picture, map, or other document, but, instead, merely an apparently random arrangement of small groups of picture elements. The means employed to obtain privacy or secrecy may broadly be said to consist of dividing the facsimile signal, as generated in a scanning operation, into a succession of "time lengths" and, before transmission, shifting these signal portions out of their normal order by a rule so complex that the resulting succession may be said to be unpredictable.

Picture transmission is just as liable to interception as are other forms of electrical communications. It has, therefore, become necessary, particularly in connection with military traffic, to devise means for "scrambling" or confusing facsimile signals. Various systems have already been developed for this purpose.

The normal signal output of a telephoto or other facsimile system is a tone or signal, the amplitude of which at a particular instant is proportional to the photographic density of the picture at the point being scanned. In order to facilitate transmission by radio means, and for other reasons, it is common practice to convert the amplitude-modulated signal to an analogous frequency-modulated signal.

Although the invention will be described in connection with facsimile transmission, it will be apparent that other types of signals can also be satisfactorily enciphered. It is very well adapted for speech scrambling.

One object of the invention is to provide an improved method for treating an electrical signal so that it can be satisfactorily enciphered.

Another object of this invention is to provide a method for dividing an electrical signal into a plurality of segments of predetermined time lengths and for then re-arranging the segments in a different order with respect to time.

It is also an object of the invention to provide means for dividing a signal such as that mentioned into segments of equal time lengths, and for rearranging the segments with respect to time.

It is a further object of this invention to provide a method for controlling said rearrangements of signal segments.

It is another object to provide means for calling up at high speed successive different rearrangements.

A still further object of the invention is to provide a method whereby a plurality of rearrangements may be caused to occur in unpredictable or substantially random order.

It is another object of the invention to provide a method of dividing a facsimile signal into segments, and for transporting these segments with a minimum of switching transients.

An additional object is to provide a method for "expanding" keying information so that much less key is necessary than in known scrambling systems.

It is a further object of the invention to provide circuits and apparatus for performing the above-indicated methods.

Figure 1:
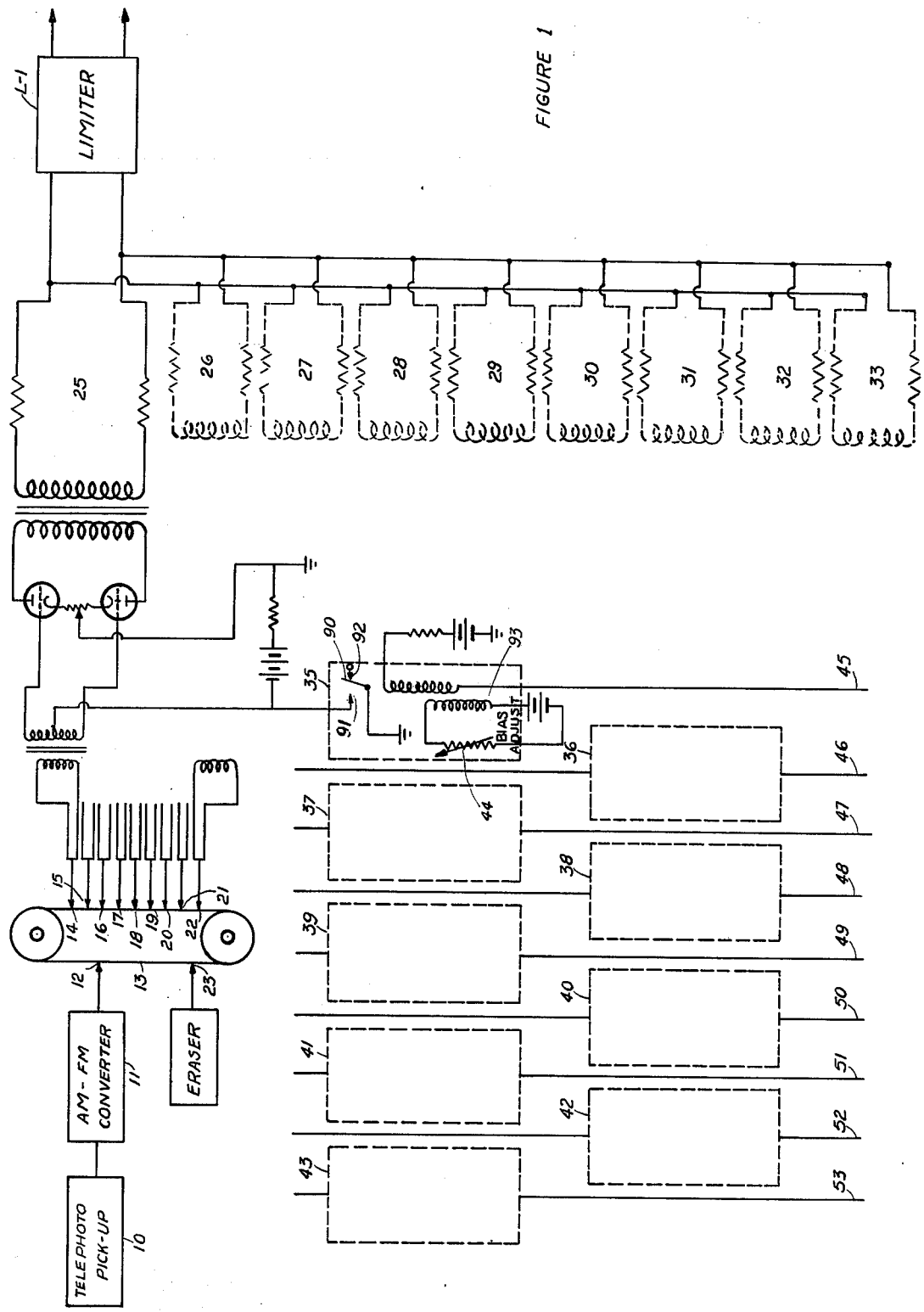
FIG. 1 is a diagram of the principal features of the transmitting apparatus of the invention.

With reference to the drawings, and particularly to FIG. 1, 10 represents a wirephoto or radiophoto pick-up device of any desired type. The output generated by said device is converted at 11 into some convenient form of frequency-modulated signal, and then is impressed by means of recording magnet 12 on the moving magnetic tape 13. A plurality of pick-up magnets, nine in the drawings, numbered 14 through 23, are arranged at equal intervals along the tape, and these are adapted to pick off repeatedly and continuously equal "time lengths" of the impressed signal.

Each one of the pick-up magnets is transformer-coupled, at 20', to a vacuum tube device, hereinafter known as an "electronic switch". All of the electronic switches are indicated, and bear the reference characters 25 through 33, but all of them are not shown in full. Generally speaking, these switches are merely electronic devices, normally non-conducting, but adapted to conduct upon proper energization, and, so considered, any one of many known circuits can be used.

The switch illustrated utilizes push-pull to assist in the control or suppression of unwanted switching transients, and because any direct current components may thus be balanced out. The conditions of the switches, whether conducting or non-conducting, depend upon the conditions of nine polarized relays, each of which has two controls. One relay with its controls is illustrated in detail, and identified by reference character 35. The other relays, together with their controls, are shown as blocks only, and are numbered 36 to 43. One of the controls for relay 35 is represented by "Bias Adjustment" 44; the other is supplied by signals appearing on wires 45 to 53, inclusive, these signals being determined by the relay and distributor arrangement illustrated in FIG. 2. A special function of the Bias Adjustment 44 will be explained further in connection with the description of the operation of the apparatus.

Figure 2:
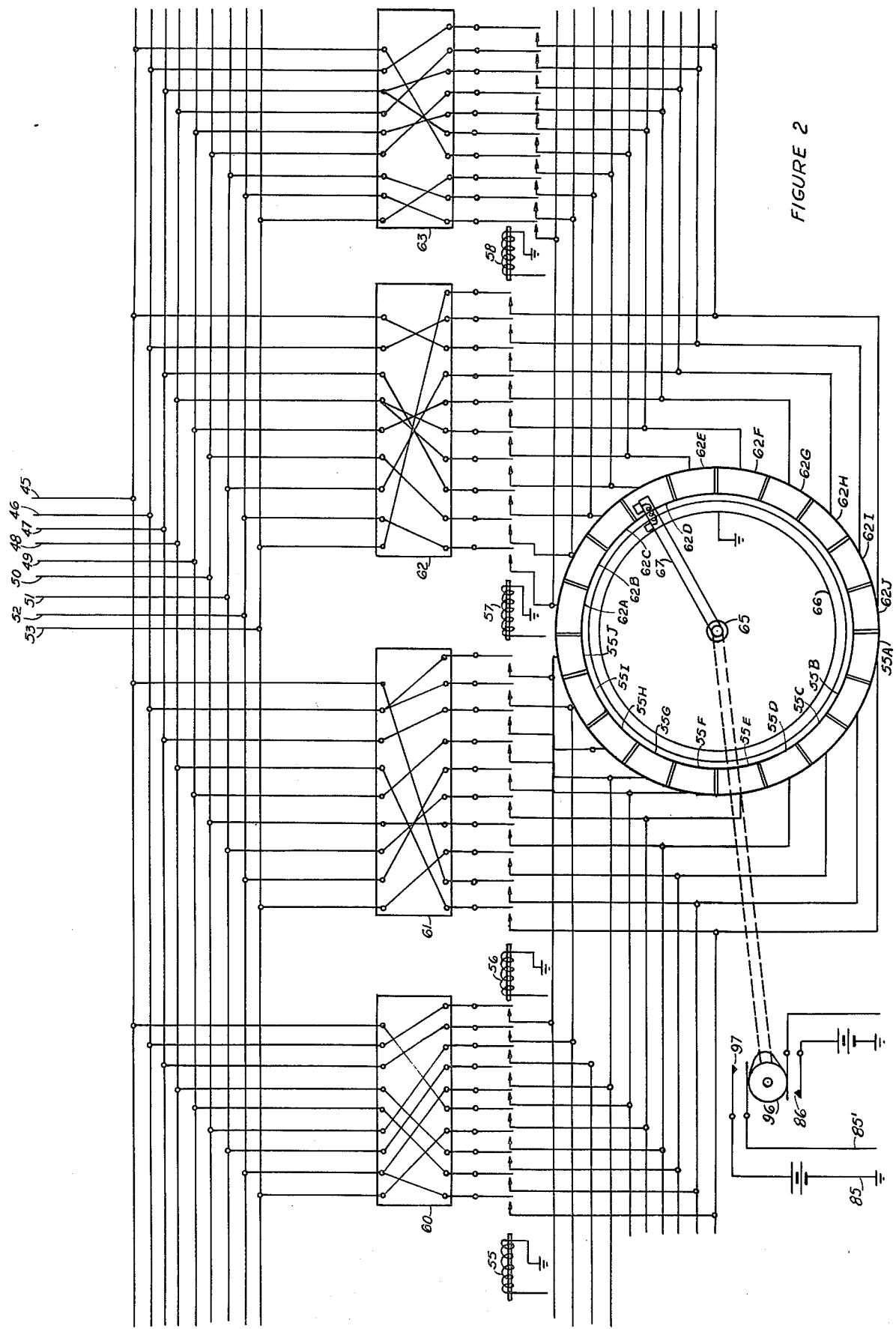
FIG. 2 is a diagram of the permuting or scrambling elements.

Wires 45 through 53 receive their signals through a plurality of relay contacts illustrated in FIG. 2. These relay contacts are arranged in groups, and they and their respective energizing magnets—one for each group—are represented by reference characters 55, 56, 57, 58. The number of relays may be as large as desired, as will be apparent from later description.

The relays are arranged in two banks; ordinarily, the banks will contain equal numbers of relays, but this is not essential. Thus, in FIG. 2, 55 and 56 appear in one bank, and 57 and 58 appear in the other bank. The signals controlled by the relay contacts 55, 56, 57, 58 are received from individual segments of a distributor 65, which is provided with a slip ring 66, and a rotating brush member 67, the operation of which will be apparent. From the several relay contacts, signals are introduced to the permuting elements or scramblers 60, 61, 62, and 63, here shown as simple connecting blocks, the various input and output terminals being connected in accordance with a prearranged code. Some representative arrangements are shown. Means will commonly be provided for varying these cross connections quickly and easily.

Assuming magnet 55 to be energized (the means for selecting and energizing the magnets will be later described), and all of the contacts 55 to be closed, and the distributor brush 67 to be rotating, it will be seen that as the brush sweeps over contact segments 55A–55J, ground is transferred from the slip ring 66, through the successive contact segments, through the relay contacts 55, through the cross-connections in permuter 60, and appears in a predetermined order on wires 45–53, the order being determined by the cross-connections in permuter 60.

When brush 67 sweeps segments 62A–62J, ground appears on wires 45–53 in some different prearranged order, if relay 57 or 58 is energized and its contacts closed.

Figure 3:
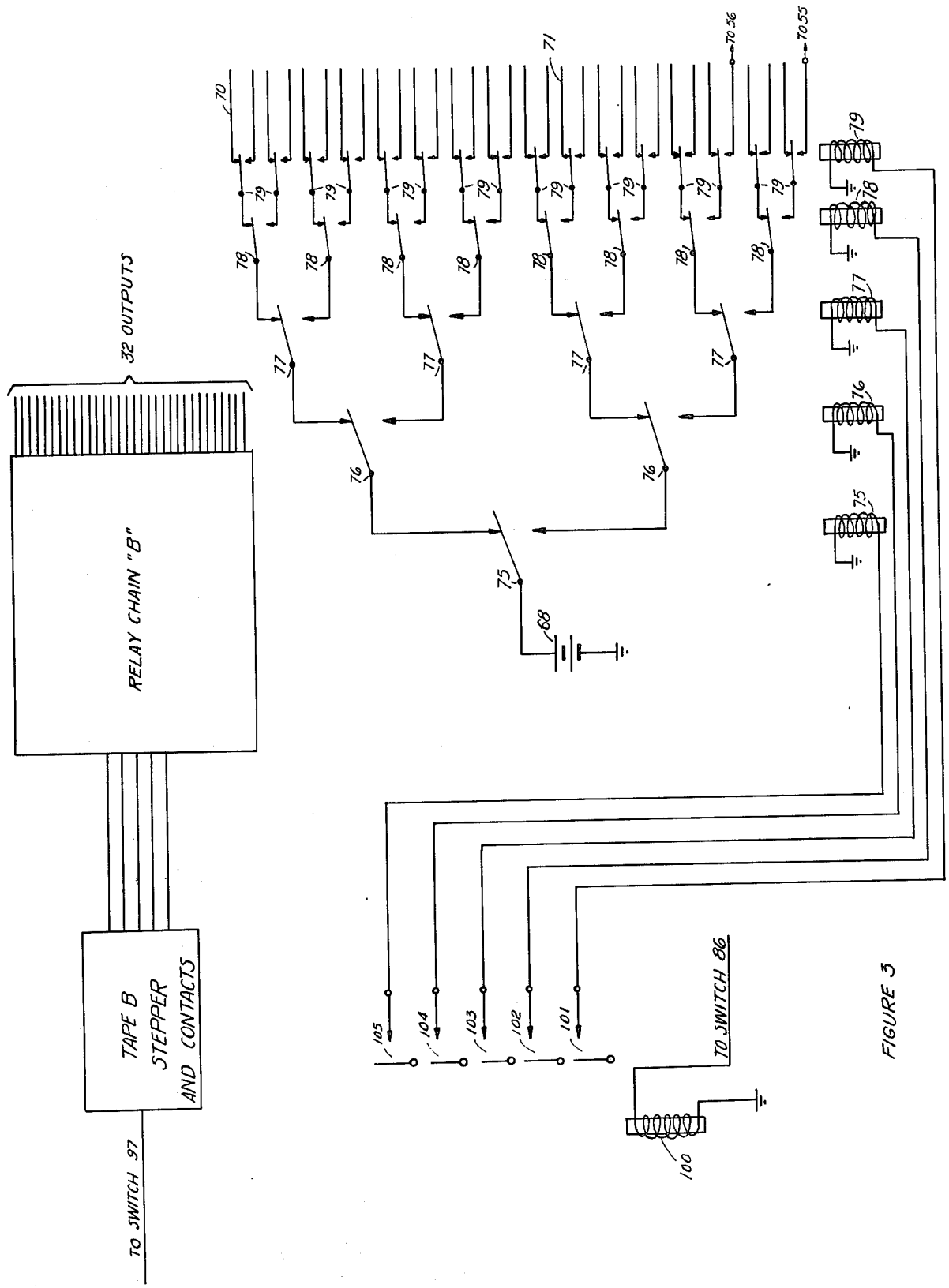
FIG. 3 illustrates, partly in block diagram, the means for providing a coding signal.

The means for determining which relay of which bank of relays will be energized at a particular time may be seen in FIG. 3, where a chain of relay contacts is illustrated. Windings for the chain are numbered from 75 to 79, inclusive, and the contacts actuated by each winding bear similar reference characters.

As shown in FIG. 3, all relay contacts are biased, their normal positions being against the upper one of the two fixed contacts with which they cooperate. Under these circumstances a signal from battery 68 will emerge from the chain of contacts at terminal 70. If it be assumed that the windings 75 and 78 are energized, it can be seen that a signal from battery 68 will emerge at terminal 71. In other words, only one out of the thirty-two output contacts of the chain will be energized at any one time. The selection of the output contact to be energized depends, of course, upon the energization of a winding in the group 75, 76, 77, 78, 79.

The selection of one of these windings in turn depends upon a tape-operated mechanism shown schematically in FIG. 3. This mechanism is conventional, and will not be described in full. It includes a winding 100 which when energized produces stepping in a perforated control tape. There may be as many as five perforations transverse of the tape or there may be any lesser number. Whenever a perforation is brought into proper position, one of the switches 101, 102, 103, 104, or 105 is closed. If three perforations occur in the same transverse line, three of the switches will be closed, etc.

Current for winding 100 is supplied intermittently under the control of cam 96 (see FIG. 2) which closes in turn contacts 86 and 97. When switch 86 is open and winding 100 thus deenergized, the paper tape is at rest. When the switch 86 is closed, the tape steps one or some other preselected number of units.

Switch 97 controls Tape Stepper B and its associated parts (FIG. 3) just as switch 86 controls the stepper 100–105.

The two steppers are used alternately, the result being that the two banks of relays shown in FIG. 2 are utilized in turn.

Control cam 96, mentioned above, is oriented with respect to brush member 67 in such a manner that, while the brush is traversing contact segments 62A through 62J and thus supplying signals to wires 45 through 53 by means of the right-hand bank of relays (FIG. 2), the tape governing the left-hand bank of relays is being stepped. When the brush is sweeping contact segments 55A through 55J and thus supplying signals to the left-hand bank of relays, the right-hand bank is idle, and during this period the tape mechanism for this bank of relays is actuated. During this period, also, a new code can be set up in the permuting elements or scramblers used with the relay bank.

By utilizing a randomly-punched tape, random selection of the permuting elements is achieved.

The arrangement is economical with perforated tape, and also provides for accurate operation, since the parts move relatively slowly.

The speed of magnetic tape 13, FIG. 1, is so maintained that the time interval between any two pick-up magnets 14 to 22, inclusive, is equal to the time required for brush 67 to transverse one segment on distributor 65.

With reference to the polar relay 35, and its controls, it may be said that the signals coming off of distributor 65 are subject to certain irregularities. If the width of brush 67 does not correspond exactly with the spacing between the contact segments, either there will be gaps between the several signals or there will be overlapping. Obviously, a perfect relation between the contact separators and the brush is desirable, but it is, in practice, very difficult to achieve.

The movable element 90 of polar relay 35 actually controls the condition of electronic switch 25. This armature has only one effective cooperating contact 91. A second contact 92 serves merely to limit the movement of movable contact 90. Normally, current flowing through the bias winding 93 holds contact 90 against contact 92. When a signal comes in over wire 45, it must overcome the effect of the current in bias winding 93. The result is a slight lag in the closing of armature 90 upon its cooperating contact 91. Variation in the current flow through the bias winding by means of variable resistor 44, permits both retardation and acceleration within limits of the operation of relay 35.

Figure 4:
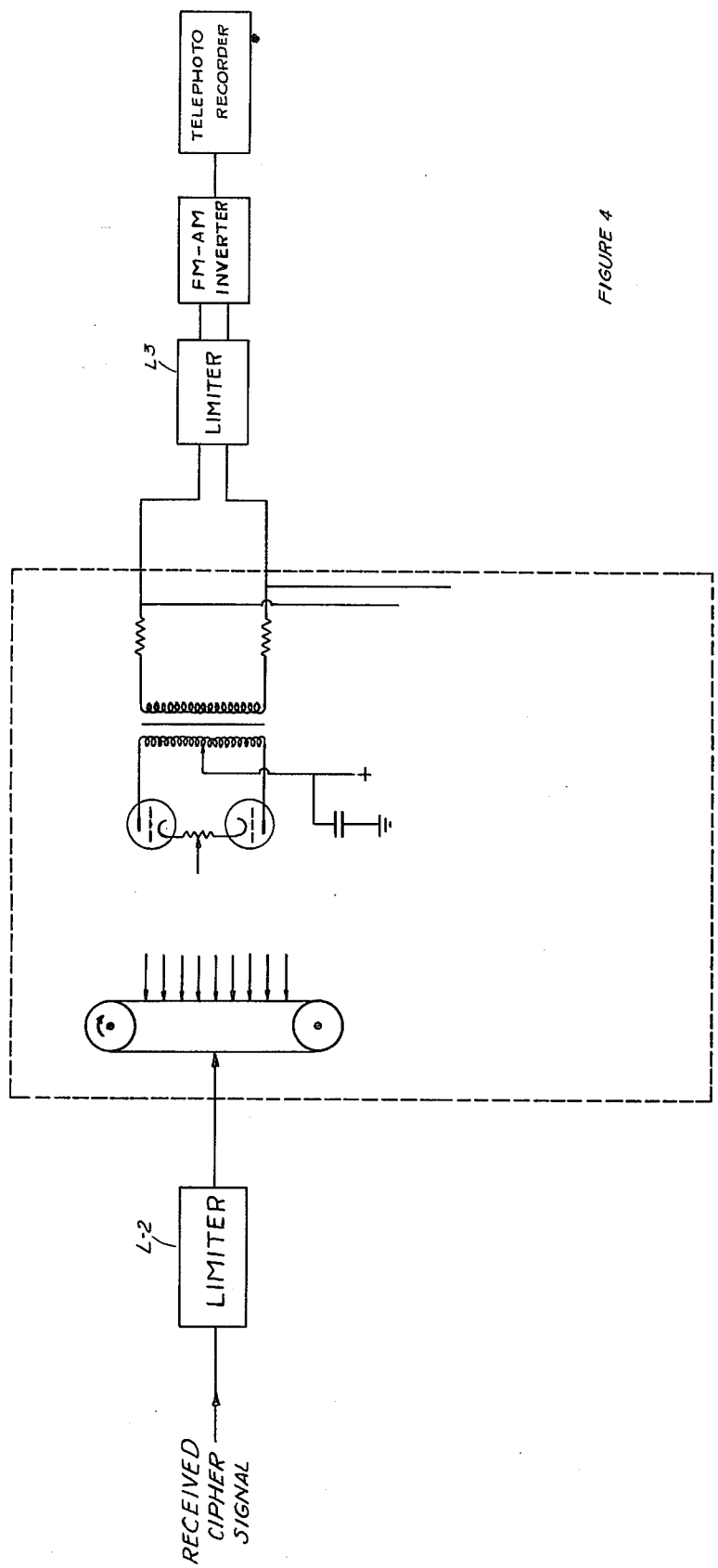
FIG. 4 is a diagram of the main elements of the receiving apparatus.

Referring to FIG. 4, the receiving apparatus of the invention utilizes the same elements as the transmitting apparatus described above, but in reverse order; of course, no pickup is required, and a recording or reproducing device is connected at the output. Simply by throwing two switches, therefore, and properly arranging the permuting elements, the apparatus can be used alternately for transmission and reception. The showing of FIG. 4 is fragmentary, as the operation of the receiving apparatus will be readily understood.

The limiter circuits, L-1 of FIG. 1, and L-2 and L-3 of FIG. 4, serve to clip off undesirable voltage pulses developed through switching or otherwise.

Synchronization of the transmitting and receiving mechanisms can be handled by conventional methods, well covered in prior art disclosures.

Figure 5:
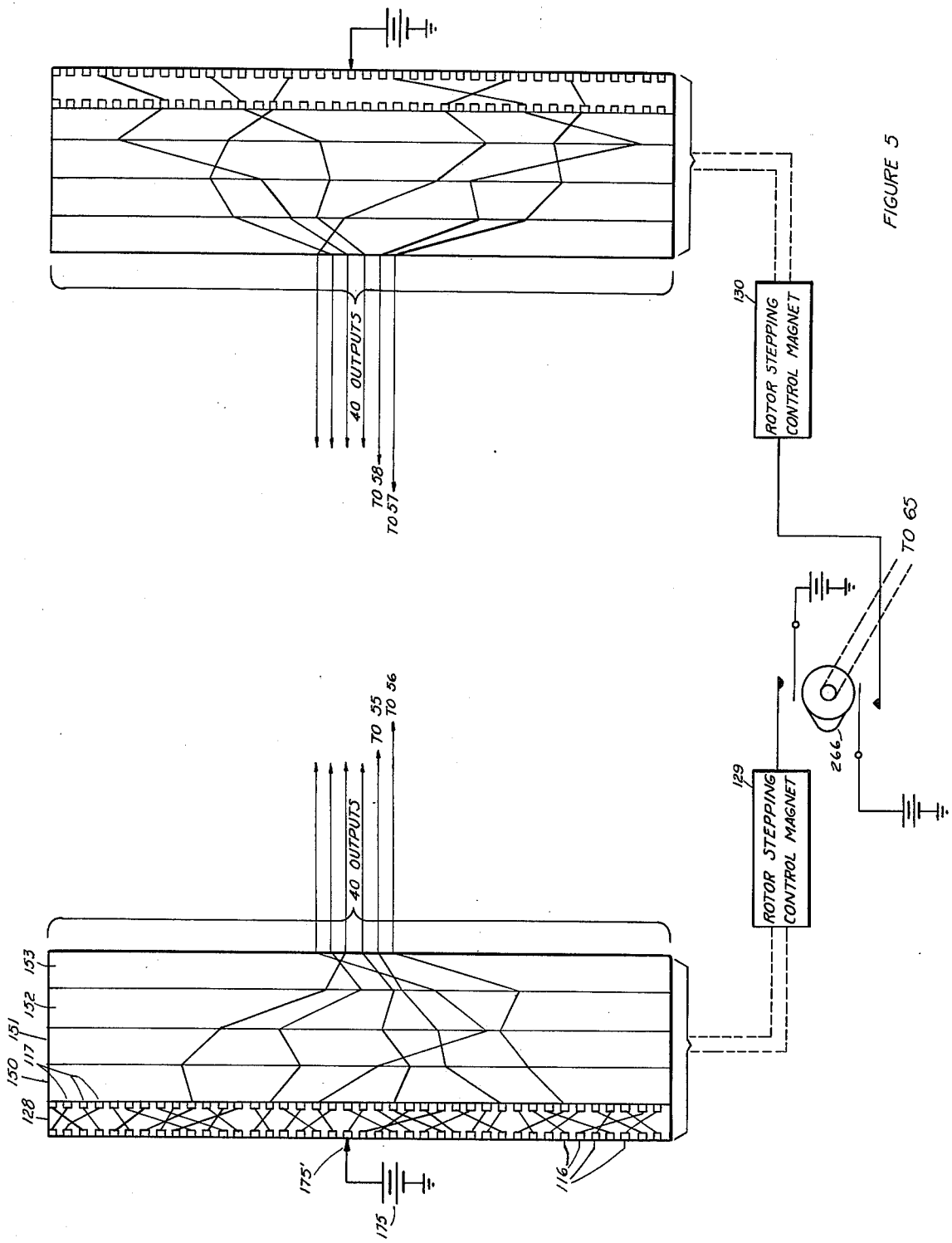
FIG. 5 illustrates a rotor system which may be used with the apparatus of FIG. 2 in place of the relay chain of FIG. 3.

An alternate control system is illustrated in FIG. 5. In place of the relay chains of FIG. 3, cryptographic rotor systems are used.

The exact type of rotor is not important to the principles of the invention. A common type is shown diagrammatically at 128, where it can be seen to comprise two groups of contacts, with substantially random connections therebetween. One group of contacts (represented by 116) serve as inputs, and the other (117), as outputs. The details of all of the several rotors are not shown.

The rotors illustrated are arranged in two banks. Since the banks are identical, or may be so, only one will be described herein. For the purposes of this description, five rotors are shown in each bank; and each rotor includes forty input and forty output contacts. The number of contacts to be employed will depend upon the number of relays in each of the banks of relays 55–56 and 57–58 of the permuting apparatus of FIG. 2.

In accordance with usual practice, the rotors of FIG. 5 are caused to step at intervals so as to modify the electrical paths therethrough. Such stepping means are well known and will not be described in detail; they are shown in FIG. 5 merely as blocks 129 and 130.

Fixed contact 175' is adapted to bear against rotor 128, and the spacing of the contacts 116 is so calculated with respect to contact 175' and the stepping of the rotors that whenever the rotor comes to rest, an electrical circuit is formed which includes battery 175 and one of the contacts 116. In other words, some contact 116 always comes to rest beneath contact 175'.

The rotor used herein is broadly of the type shown and described in the U.S. Pat. No. 1,683,072 to Hebern.

The apparatus of FIG. 5 is intended for substitution in the organizations of FIGS. 2 and 3. Thus, cam 266 is to be driven by the rotating arm of distributor 65, but, instead of producing alternate movement of two or more keying tapes (FIG. 3), it causes sequential stepping of the rotor banks. As in the embodiment earlier described, the control cam 266 is so oriented with respect to the brush of the distributor, that a new code is set up in one portion of the apparatus (that is, the rotors of one bank are stepped), while signals are being supplied to the other portion.

Figure 6:
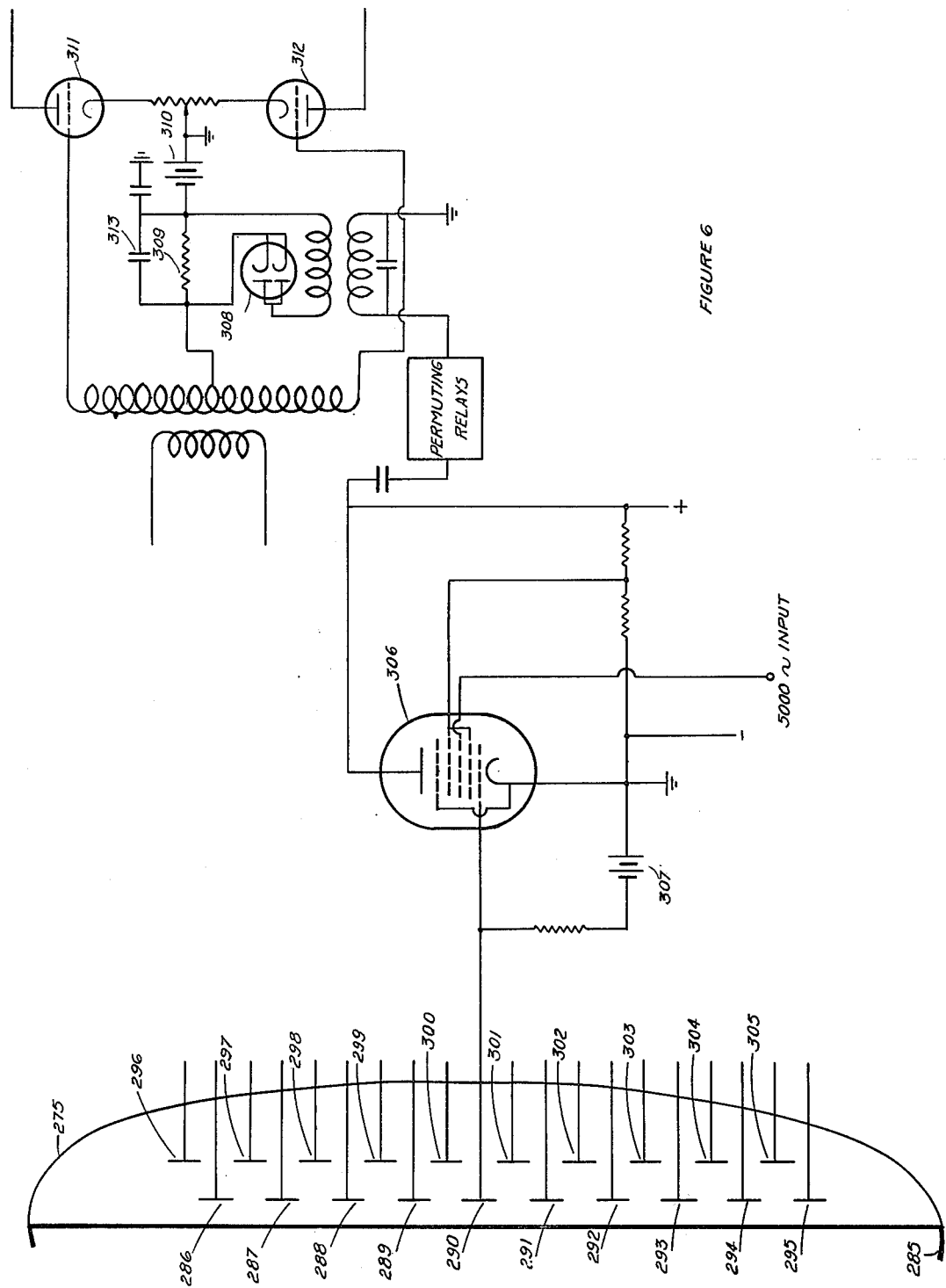
FIG. 6 illustrates a cathode ray tube distributor which may be utilized with the invention in place of the mechanical means of FIGS. 2 and 6.
Figure 7:
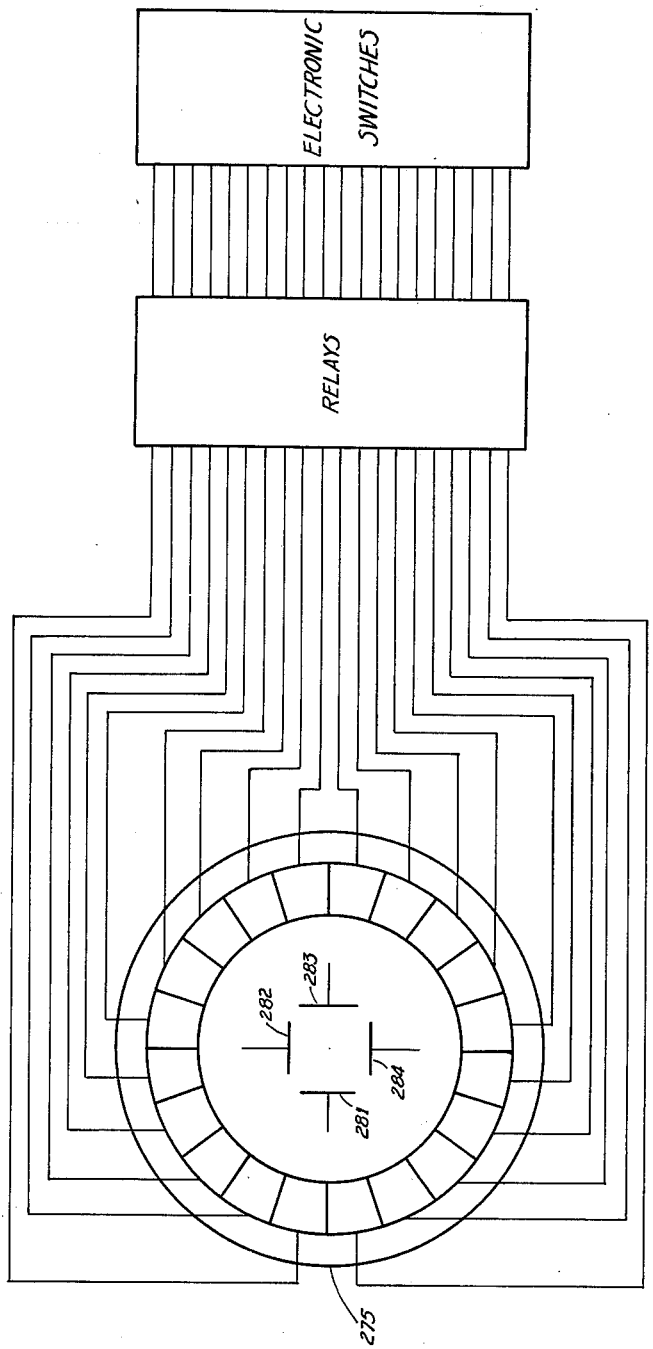
FIG. 7 is a block diagram indicating the manner in which the device of FIG. 6 is used.

According to FIGS. 6 and 7, the mechanical distributor of FIG. 2, used for controlling the polar relays, 35 to 43, inclusive, (FIG. 1), can be replaced by a cathode ray tube distributor. The electronic distributor comprises an envelope 275 (only a portion of which is shown) similar to that employed in a standard cathode ray tube. The deflecting plates 281, 282, 283, and 284 and the collector anode 285 are also substantially standard construction.

The distributor proper consists of twenty cold plates 286 through 305, coated with emissive material, arranged adjacent the front of the tube and inside the same in two parallel circles, there being 10 plates in each circle. Plates 286 and 295, inclusive, are arranged in an inner circle and these plates are spaced apart a distance equal to their diameter. The outer row of plates, 296 through 305 (those adjacent the front of the tube), are arranged in a similar circle; they may be somewhat larger than the first mentioned plates, and, if so, are arranged so that each overlaps two of the plates 286 through 295.

A rotating electric field, applied across deflecting plates 281, 282, 283, and 284 directs the electron beam so that it sweeps plates 286 through 305, one after the other, and the controlling frequency is so adjusted as to provide output pulses of desired duration. Although plates 296 to 305 may be larger than plates 286 to 295, the portions exposed to the rotating cathode beam are the same, these portions being limited by the spaces between the plates of the inner circle.

Tube 306 normally does not conduct. Its first control grid is maintained at some predetermined negative potential, for example, −10 V., by battery 307. The second control grid has applied thereto a 5000 cycle signal at −15 V.

As the cathode ray sweeps the several plates in turn, secondary emission occurs, leaving the plates with small positive charges. Such a charge, when applied to the first signal grid of tube 306 makes this grid positive, or sufficiently less negative than before to cause the tube to conduct.

The 5000 cycle output of tube 306 is passed through permuting relays like those of FIG. 2, rectified at 308, and produces a voltage drop across resistor 309 just sufficient to overcome battery 310 which normally biases tubes 311 and 312 of the electronic switch below cut-off. Condenser 313 serves to smooth out the pulsations present in the output of rectifier 308.

Referring again briefly to FIG. 2, it will be noticed that ten contacts are shown on the input side of each of the permuting elements, whereas only nine output contacts are shown. This feature is the outgrowth of the use of certain peculiar codes for permuting the switching signals; it is not claimed herein as a part of the present invention.

While the invention is specifically directed to the encryptment of facsimile, and has been so described, it will be apparent that other types of signals can be handled with equal facility, and it is to be understood therefore, that except where required by the appended claims the invention is not not to be construed as limited by the type of signal involved.

The specific nature of the description in other respects also should not be considered as restricting the invention, the true scope of which will be set forth in the claims.

I claim:

1. In an apparatus of the nature described, the combination of means for storing a portion of an electrical signal, means for picking up segments of said portion, a plurality of switching means controlling the conduction of said segments, said switching means each having a conducting condition and an open condition, and means for controlling the conditions of said switching means including a relay chain having a plurality of outputs, a bank of groups of relay contacts each group including as many contacts as there are switching means, means associated with the outputs of said relay chain for closing by groups the contacts of said bank, control signal supplying means for supplying signals to the contacts of the bank thereby to pass the signals through a closed group of contacts, and means for predetermining the output of said relay chain to be energized.

2. In an apparatus of the nature described, the combination of means for storing a portion of an electrical signal, means for picking up elements of said portion, a plurality of switching means controlling the conduction of said elements each switching means having a conducting condition and a nonconducting condition, and means for controlling the conductivity of the switching means including a bank of groups of switch contacts each group comprising contacts as numerous as the switching means, and means for selectively closing by groups the contacts of said bank.

3. In an apparatus of the nature described, the combination of means for impressing a communication signal on a loop of magnetic storage medium, a plurality of equispaced pickup devices arranged adjacent said loop, a switching device for each of said pickup devices, a plurality of switching contacts arranged in groups as numerous as the switching devices, means for controlling the conductivity of the switching contacts including a source of current, a plurality of electrical outlets, a perforated tape and feeler pins for making electrical contacts depending upon the condition of the tape thereby to energize the outlets the said switching contacts being closable by groups upon the energization of said outlets, distributing means for supplying signals for the switching devices through said switching contacts, and means for modifying the order of said signals.

4. The invention of claim 3, further characterized by a second plurality of switching contacts similar in arrangement and connections to the first mentioned plurality, the two said pluralities of switching contacts being used alternately.

5. An apparatus according to claim 3, further characterized by means for systematically stepping the tape.

6. The combination of claim 3, further characterized by means for transmitting the output of the switching devices, and receiving and reproducing means.

7. The combination of means for recording a portion of an electrical signal, means for picking up from said recording a plurality of approximately equal elements of said signal, a plurality of switching devices having conducting conditions and non-conducting conditions and means for applying the series of signal elements thereto, transmitting means for the signals passed through said switching devices, and means for controlling the conditions of the switching devices, comprising a plurality of groups of further switching devices having means for opening and closing the same by groups, each group being at least equal in number to the first mentioned switching devices, distributing means furnishing controlling signals from a source of current for the first mentioned plurality of switching devices to a portion only of the plurality of groups of further switching devices and then to another portion only, and means for selecting and actuating individually the means for opening and closing the groups of further switching devices.

8. The combination of claim 7, further characterized by means for mixing the output of the distributing means with respect to the first mentioned plurality of switching devices.

9. The combination of claim 7, further characterized by a control for the said selecting and actuating means including a chain of additional switching devices, and means for selectively closing the same.

10. The combination of means for generating a facsimile signal, means for recording said signal, means for picking up a series of approximately equal elements of said signal from said recording, a plurality of switching devices having conducting conditions and non-conducting conditions and means for applying the series of signal elements thereto, means for controlling the conditions of said switching devices comprising a plurality of banks of groups of further switching devices having means for opening and closing the same by groups, each group being at least equal in number to the first mentioned switching devices, distributing means for furnishing signals from a source of current to one bank only of said further switching devices and then to another bank only, means for selecting and actuating individually the means for opening and closing the groups of further switching devices of one bank only at a time, and means for transmitting the signal elements as they are passed through said first mentioned switching devices.

11. The combination of claim 10, further characterized by a control for the selecting and actuating means including a chain of additional switching devices for each bank of groups of further switching devices, and means for selectively closing the additional switching devices of one chain and then of another chain.

* * * * *